[11] 3,597,048

[72] Inventor Ludwig Bertele
Gartenstrasse, Heerbrugg, Switzerland
[21] Appl. No. 797,455
[22] Filed Feb. 7, 1969
[45] Patented Aug. 3, 1971
[32] Priority Aug. 28, 1963
[33] Switzerland
[31] 10704/63
Continuation-in-part of application Ser. No. 391,528, Aug. 24, 1964, now Patent No. 3,466,113, dated Sept. 9, 1969.

[54] VARIFOCAL OBJECTIVE WITH MOVABLE LENS COMPONENT OF POSITIVE REFRACTIVITY
10 Claims, 5 Drawing Figs.

[52] U.S. Cl. ........................................ 350/184, 350/215
[51] Int. Cl. ........................................ G02b 15/14
[50] Field of Search.............................. 350/184

[56] References Cited
UNITED STATES PATENTS
3,227,042  1/1966  Smejkal et al. ............. 350/184
3,466,113  9/1969  Bertele ...................... 350/184

*Primary Examiner*—John K. Corbin
*Attorney*—Werner W Kleeman

ABSTRACT: A variable focal length objective of simple physical construction affording a relative aperture of 1:1.4 or greater and an image forming power that meets high requirements. The objective comprises at least 6 lens members, the second lens member being displaceably mounted so as to change the focal length. With respect to the side of the longer conjugate, the first lens member of the objective has a dispersing or negative power, the second and third lens members have a positive or collective power, the lens surface of the fourth lens member is convexly formed to such a degree that its radius of curvature is shorter than the radius of curvature of the preceding glass-air surfaces. The first lens member is further shaped in such a fashion that the stronger curved surface thereof exhibits a dispersing or negative power and is curved towards the second lens member. Regardless of the position of the displaceable second lens member the focal length of the first two lens members taken together is always positive.

VARIFOCAL OBJECTIVE WITH MOVABLE LENS COMPONENT OF POSITIVE REFRACTIVITY

This application is a continuation-in-part of my copending application, Ser. No. 391,528, filed Aug. 24, 1964, now U.S. Pat. No. 3,466,113, granted 24 9, 1969 and entitled: "VARIFOCAL OBJECTIVE WITH MOVABLE LENS COMPONENT OF POSITIVE REFRACTIVITY."

The present invention relates to an objective with a variable focal length, for example, for exposure and projection purposes.

In accordance with the invention there is provided an objective of variable focal length comprising at least six lens members, wherein, considering the lens members from the object side, which is the side of the longer conjugate of the objective, the first has a negative power, the second is displaceable and has a positive power, the third has a positive power and the fourth has a surface with convex curvature, which surface is the nearer surface of he fourth lens member to the third lens member and has a radius of curvature which is shorter than that of the air-glass surfaces of the preceding three lens members.

Independently of the position of the second lens member, the focal length of the first two lens members taken together is always positive.

Objectives are known having a different sequence of refractive powers in which, regarded from the side of the longer conjugate, the first lens member has a positive power, the second displaceable member has a negative power and the third fixed member again has a positive power. The focal length of the first two lens members is in any case negative. With this objective, the image after the second lens member is therefore virtual and, thus, is on the object side of this lens. This position of the image places an increased demand on the further lens members as regards their refractive powers. However, if there is chosen for the first lens members an arrangement which produces a real image position after the displaceable lens, some of the following lens members are considerably relieved as to criticality. In this way the production of a large relative aperture for the entire system is simplified and it has been shown by investigation that the weakening of the refractive powers of individual lens members provides a considerable improvement in the image-forming power of the system. These advantages can be produced if the first lens member, turned towards the object, has a negative or dispersive power, the second displaceable lens member has a positive or collective power, he third lens member has a positive power and that lens surface of the fourth lens member nearest the third lens member is made convex. The further design of the fourth and the following lens members will be in accordance with optical requirements.

In order to obtain the best possible conditions as regards correction in each position of the second lens member, it is further possible to ensure that, in the first lens member, he more strongly curved surface having a negative or dispersing action is curved towards the second lens member. The curvature of this surface can be so strong that the first lens member becomes a meniscus curved towards the second members. If the following positive or collective lens member is constructed as a simple lens, this lens is expediently of a bi-convex form.

The focal length of the first lens member is so chosen that this focal length is less than 9 times and greater than 2.5 times that of the free lens diameter which is used. The focal length of the displaceable second lens member is smaller than 6 times and greater than 1.5 times that of the necessary free lens diameter.

Should the transverse color errors occurring to a slight degree with the displacement of the collective lens by disturbing, both or only one of the first two lens members can be formed as cemented members and can also be subdivided in two or more single lenses.

The further design of the fourth lens member and the following lens members can vary. A preferred lens sequence is formed, because of its simplicity, by a positive or collective lens as the fourth lens member with its convex surface facing the object, by the fifth lens member as a negative or dispersive lens of which the more strongly curved surface faces the image, and by the sixth lens member as a positive or collective lens.

In order to produce the best possible zonal correction of the spherical aberration, it has proved to be advantageous to make the radius of the strongly convexly curved surface of the fourth lens member less than half the focal length of the lens group consisting of the third, fourth, fifth and sixth lens members.

Further, according to the primary object of this invention, any one of the lens members, or a combination of the fourth or succeeding lens members, can be compound members, either with cemented or air spaced elements.

For a better understanding of the invention and to show how the same may be carried into effect, reference will now be made, by way of example, to the accompanying drawings in which.

In the FIGS. and Examples, the symbols $r$ represent the radii of curvature, the symbols $d$ represent the thicknesses of the lenses and the symbols $l$ the airspaces. The symbol $n_d$ represents the refractive index for the helium line, and the symbol $\gamma_d$ represents the Abbe number. The symbol $s_o'$ represents the backfocus on the film side.

EXAMPLE 1

Figure 1:
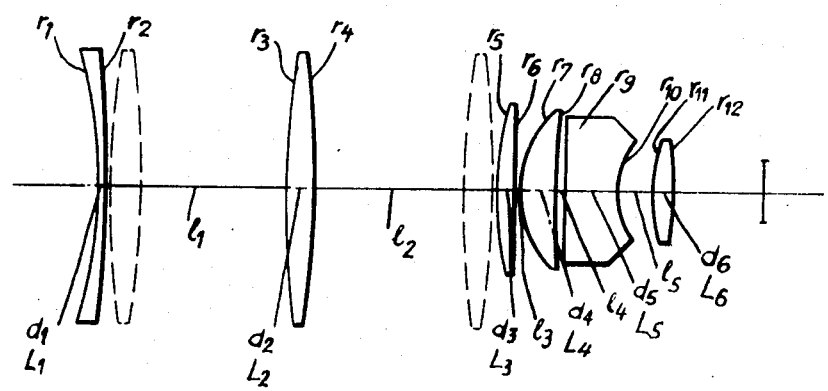
FIG. 1 illustrates a six-member objective according to the present invention.

In Fig. 1, $L_1$ is a negative, or dispersing, first lens member, $L_2$ is a displaceable positive, or collective, second lens member, while $L_3$, $L_4$, $L_5$ and $L_6$ are the other lens members.

The focal length F of the entire system with the middle position of the lens member $L_2$ is 19.68 millimeters, while with a displacement of the lens member $L_2$ by 15.7 millimeters towards the rear, the focal length F is 15.65 millimeters. With an equally large displacement of the lens member $L_2$ towards the front, the focal length F is 24.7 millimeters. The focal length $F_{3-6}$ of the lens group $L_3$ to $L_6$ is 22.95 millimeters and the radius $r_7=9.819$ millimeters that is to say, 42.8 percent of this focal length.

The focal length $F_1$ of lens member $L_1$ is $-120.5$ millimeters and the free diameter is about 24 millimeters.

The focal length of $F_2$ of lens member $L_2$ is $+68.1$ millimeters and the free diameter about 24 millimeters.

The focal length $F_{1-2}$ of lens members $L_1$ and $L_2$ varies, depending upon the position of the second lens member $L_2$, from $+151$ millimeters to $+95$ millimeters.

The constructional data for the lens system is given by way of illustration by the following Table, wherein all linear measurements are given in millimeters.

TABLE 1

| | | | $n_d$ | $\nu_d$ |
|---|---|---|---|---|
| $L_1$ | $r_1=-39.6$ | $d_1=0.8$ | 1.5111 | 63.4 |
| | $r_2=-111.7$ | $l_1=16.0\pm15.7$ | | |
| $L_2$ | $r_3=+84.0$ | $d_2=2.7$ | 1.62041 | 60.3 |
| | $r_4=-84.0$ | $l_2=16.0\pm15.7$ | | |
| $L_3$ | $r_5=+35.0$ | $d_3=1.8$ | 1.62041 | 60.3 |
| | $r_6=\infty$ | $l_3=0.15$ | | |
| $L_4$ | $r_7=+9.8186$ | $d_4=3.3$ | 1.62041 | 60.3 |
| | $r_8=+52.0$ | $l_4=0.6$ | | |
| $L_5$ | $r_9=+400.0$ | $d_5=4.8$ | 1.7618 | 27.0 |
| | $r_{10}=+6.8778$ | $l_5=3.16$ | | |
| $L_6$ | $r_{11}=+14.9628$ | | | |
| | $r_{12}=-32.3126$ | $d_6=2.7$ | 1.6910 | 54.8 |

NOTE: $s_0'=7.74$; $F=19.68$ in middle position of $L_2$.

EXAMPLE 1a

Figure 1A:
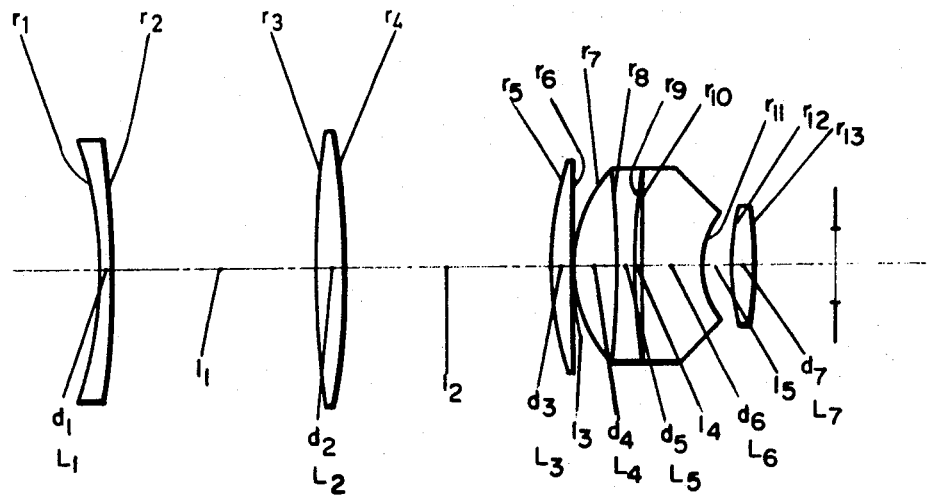
FIG. 1a illustrates an objective according to the present invention with the fourth lens member being a cemented member.

In FIG. 1a, $L_1$ is also a negative, or dispersing, first lens member and $L_2$ is a displaceable positive, or collective, second lens member $L_4$ is a positive double-convex lens element cemented to $L_5$ which is a negative, double-concave, lens element, the resulting cemented lens member being a positive, or collecting, lens.

The focal length $F_{3-7}$ of the lens group $L_3$ to $L_7$ is 27.13 millimeters and the radius $r_7=12.37$ millimeters, or 48.8 percent of this focal length.

The focal length $F_1$ of lens member $L_1$ is −100.73 millimeters and the free lens diameter is about 23 millimeters.

The focal length $F_2$ of lens member $L_2$ is +60.17 millimeters and the free lens diameter is about 24 millimeters.

The focal length $F_{1+2}$ of lens members $L_1$ and $L_2$ varies, depending on the position of the second lens member $L_2$, from +141 millimeters to +77 millimeters.

TABLE 1a

| | | | $n_d$ | $\nu_d$ |
|---|---|---|---|---|
| $L_1$ | $r_1=-34.37$ | $d_1=1.10$ | 1.53172 | 59.6 |
| | $r_2=-97.00$ | $l_1=18.20\pm17.9$ | | |
| $L_2$ | $r_3=+85.00$ | $d_2=2.80$ | 1.64050 | 60.1 |
| | $r_4=-69.61$ | $l_2 18.20\pm17.9$ | | |
| $L_3$ | $r_5=+29.50$ | $d_3=1.90$ | 1.55232 | 63.5 |
| | $r_6=+319.10$ | $l_3=0.15$ | | |
| $L_4$ | $r_7=+12.37$ | $d_4=4.00$ | 1.64050 | 60.1 |
| $L_5$ | $r_8=-80.00$ | $d_5=1.50$ | 1.68893 | 31.2 |
| | $r_9=+53.00$ | $l_4=0.72$ | | |
| $L_6$ | $r_{10}=+288.86$ | $d_6=5.40$ | 1.72825 | 28.4 |
| | $r_{11}=+7.55$ | $l_5=2.50$ | | |
| $L_7$ | $r_{12}=+21.00$ | $d_7=2.20$ | 1.73520 | 35.8 |
| | $r_{13}=-32.00$ | | | |

In the middle position of $L_2$:
$s_0'=7.0$ mm.
$F=21.15$ mm.
Focal length range at the extreme positions of $L_2$:
15.8 mm.—28.4 mm.

EXAMPLE 2

Figure 2:
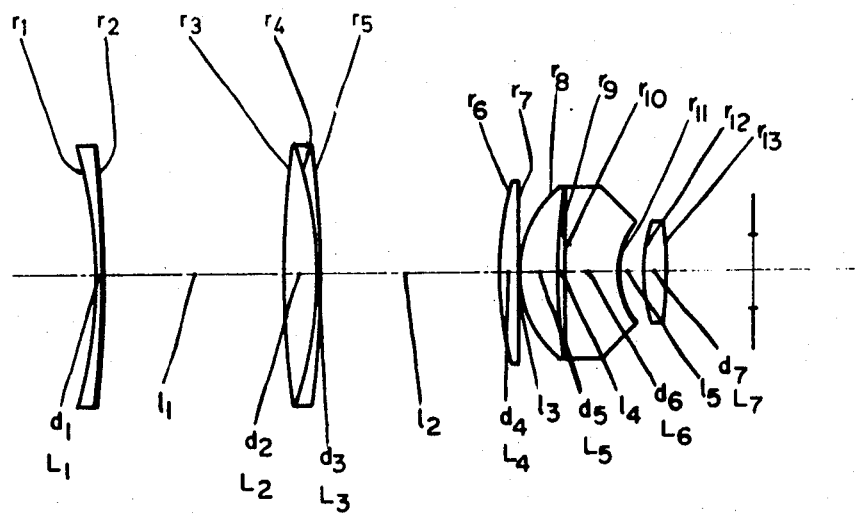
FIG. 2 illustrates an objective according to the present invention with the second lens member being a cemented member.

In FIG. 2, $L_1$ is a negative or dispersing first lens member. The second lens member is a displaceable positive, or collecting, compound lens member. The second lens member is made up of a bi-convex lens element $L_2$ cemented to a concavo-convex lens element $L_3$. Lens members $L_4$, $L_5$, $L_6$, and $L_7$ are the other lens members.

The focal length $F_{4-7}$ of the lens members $L_4$ to $L_7$ is 23 millimeters and the radius $r_8=9.62$ millimeters, or 41.8 percent of the focal length $F_{4-7}$.

The focal length $F_1$ of lens member $L_1$ is −121.7 millimeters and the free lens diameter is about 23 millimeters.

The focal length $F_{2+3}$ of the lens member $L_{2+3}$ is +68.4 millimeters and the free lens diameter is about 23 millimeters.

The focal length $F_{1-3}$ of the lens members and elements $L_1$, $L_2$, and $L_3$ varies, depending on the position of the second and third lens elements $L_{2-3}$, from +150.8 millimeters to +96.7 millimeters.

TABLE 2

| | | | $n_d$ | $\nu_d$ |
|---|---|---|---|---|
| $L_1$ | $r_1=-40.71$ | $d_1-0.60$ | 1.53113 | 62.2 |
| | $r_2=-110.56$ | $l_1-15.90\pm15.7$ | | |
| $L_2$ | $r_3=+84.23$ | $d_2-3.00$ | 1.62041 | 60.3 |
| $L_3$ | $r_4=-35.00$ | $d_3-0.50$ | 1.62004 | 36.4 |
| | $r_5=-84.23$ | $l_2-15.90\pm15.7$ | | |
| | $r_6=+30.38$ | | | |
| $L_4$ | $r_7=\infty$ | $d_4-1.70$ | 1.54883 | 45.4 |
| | | $l_3-0.15$ | | |
| $L_5$ | $r_8=+9.62$ | $d_5-3.30$ | 1.62041 | 60.3 |
| | $r_9=+49.27$ | $l_4-0.55$ | | |
| $L_6$ | $r_{10}=+368.75$ | $d_6-4.80$ | 1.72825 | 28.4 |
| | $r_{11}=+6.59$ | $l_5-2.90$ | | |
| $L_7$ | $r_{12}=+14.62$ | $d_7-2.00$ | 1.66882 | 57.4 |
| | $r_{13}=-35.85$ | | | |

In the middle position of $L_{2+3}$:
$s_0'=7.8$ mm.
$F=19.5$ mm.
Focal length range at the extreme position of $L_{2+3}$:
15.5 mm.—24.5 mm.

EXAMPLE 3

Figure 3:
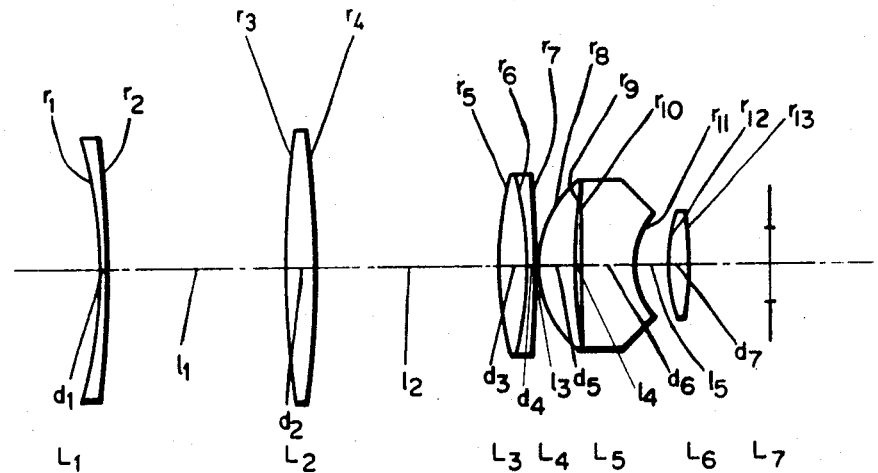
FIG. 3 illustrates an objective according to the present invention, with the third lens member being a cemented member.

In FIG. 3, $L_1$ is a negative, or dispersing, first lens member and $L_2$ is a displaceable positive, or collecting, second lens member. $L_3$ is a double convex lens element cemented to $L_4$ which is a concavo-convex lens element. The resulting cemented lens member $L_{3+4}$ is a positive lens.

TABLE 3

| | | | $n_d$ | $\nu_d$ |
|---|---|---|---|---|
| $L_1$ | $r_1=-40.71$ | $d_1=0.60$ | 1.53172 | 48.80 |
| | $r_2=-110.56$ | $l_1=15.90\pm15.7$ | | |
| $L_2$ | $r_3=+84.00$ | $d_2=3.00$ | 1.62041 | 60.30 |
| | $r_4=-84.00$ | $l_2=15.90\pm15.7$ | | |
| | $r_5=+30.00$ | | | |
| $L_3$ | $r_6=-32.00$ | $d_3=2.50$ | 1.52542 | 64.70 |
| $L_4$ | $r_7=-142.40$ | $d_4=0.80$ | 1.62374 | 47.00 |
| | | $l_3=0.15$ | | |
| | $r_8=+9.62$ | | | |
| $L_5$ | $r_9=+49.27$ | $d_5=3.30$ | 1.62041 | 60.30 |
| | | $l_4=0.55$ | | |
| $L_6$ | $r_{10}=+330.00$ | $d_6=4.80$ | 1.72825 | 28.40 |
| | $r_{11}=+6.568$ | $l_5=2.90$ | | |
| $L_7$ | $r_{12}=+14.62$ | $d_7=2.00$ | 1.67003 | 47.10 |
| | $r_{13}=-35.85$ | | | |

The focal length $F_{3-7}$ of the lens group $L_3$ to $L_7$ is +22.8 millimeters and the radius $r_6$=9.62 millimeters, or 42 percent of the focal length $F_{3-7}$.

The focal length $F_1$ of lens member $L_1$ is −121.5 millimeters and the free lens diameter is about 23 millimeters.

The focal length $F_2$ of lens member $L_2$ is +68.2 millimeters and the free lens diameter is about 23 millimeters.

The focal length $F_{1+2}$ of lens members $L_1$ and $L_2$ varies, depending on the position of the second lens member $L_2$, from +150.3 millimeters to +95.7 millimeters.

In the middle position of $L_2$:
$s_o'$=7.25 mm.
$F$=19.5 mm.

Focal length range at the extreme position of $L_2$:
15.5 mm—24.5 mm.

EXAMPLE 4

Figure 4:
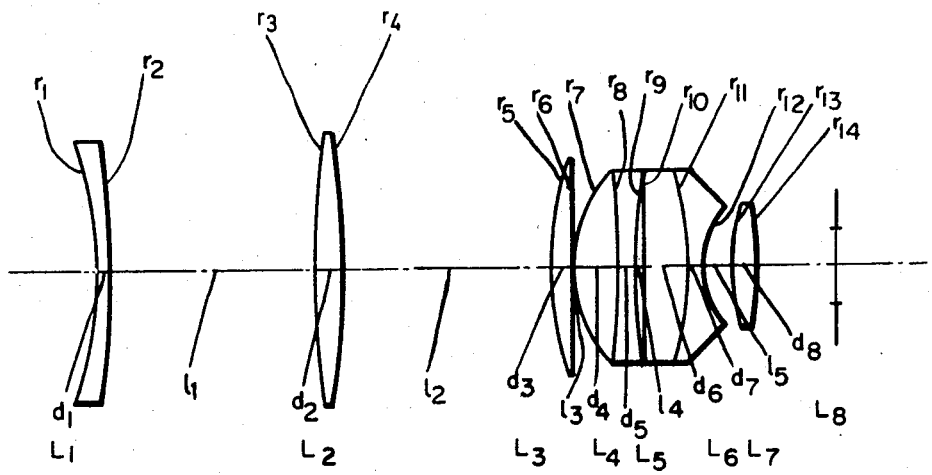
FIG. 4 illustrates an objective according to the present invention with the fourth and fifth lens members being cemented members.

In FIG. 4, $L_1$ is a negative first lens member and $L_2$ is a displaceable positive second lens member. $L_4$ and $L_5$ are essentially the same as in Example 1a. $L_6$ and $L_7$ together make a cemented member which is approximately equivalent to $L_6$ of Example 1a.

The focal length $F_{3-8}$ of the lens group $L_3$ to $L_8$ is +27.1 millimeters and the radius $r_7$=45.8 millimeters, or 45.8 percent of focal length $F_{3-8}$.

The focal length $F_1$ of lens member $L_1$ is −100.7 millimeters and the free lens diameter is about 23 millimeters.

The focal length $F_2$ of lens member $L_2$ is +60.2 millimeters and the free lens diameter is about 24 millimeters.

The focal length $F_{1+2}$ of lens members $L_1$ and $L_2$ varies, depending on the position of the second lens member $L_2$, from +141 millimeters to +77 millimeters.

TABLE 4

| | | | $n_d$ | $\nu_d$ |
|---|---|---|---|---|
| $L_1$ | $r_1$=−34.37 | $d_1$=1.10 | 1.54869 | 45.4 |
| | $r_2$=−91.93 | $l_1$=18.20±17.9 | | |
| $L_2$ | $r_3$=+85.00 | $d_2$=2.80 | 1.64050 | 60.1 |
| | $r_4$=−69.60 | $l_2$=18.20±17.9 | | |
| $L_3$ | $r_5$=+29.50 | $d_3$=1.90 | 1.55232 | 63.5 |
| | $r_6$=+319.00 | $l_3$=0.15 | | |
| $L_4$ | $r_7$=+12.37 | $d_4$=4.00 | 1.64050 | 60.1 |
| $L_5$ | $r_8$=−80.00 | $d_5$=1.50 | 1.68893 | 31.2 |
| | $r_9$=+53.00 | $l_4$=0.72 | | |
| $L_6$ | $r_{10}$=+288.86 | $d_6$=4.00 | 1.72000 | 50.4 |
| $L_7$ | $r_{11}$=−28.96 | $d_7$=1.40 | 1.72825 | 28.4 |
| | $r_{12}$=+7.57 | $l_5$=2.50 | | |
| $L_8$ | $r_{13}$=+21.00 | $d_8$=2.20 | 1.73520 | 35.8 |
| | $r_{14}$=−32.00 | | | |

In the middle position of $L_2$:
$s_o'$=7.0 mm.
$F$=21.1 mm.

Focal length range at the extreme positions of $L_2$:
15.8 mm.—28.4 mm.

What I claim is:

1. An objective of variable focal length comprising six lens members, at least one of said lens members being a compound lens member, wherein, considering the lens members from the side of the longer conjugate:
   a. the first lens member is a dispersing meniscus which is curved toward the second lens member;
   b. the second lens member is a displaceable bi-convex lens member of positive power;
   c. the first and second lens members together have a posi-
   d. the third lens member has a positive power and the convex surface facing the second lens member is more strongly curved than the lens surface facing away therefrom;
   e. the fourth lens member has positive power with a convex curved surface facing the third lens member;
   f. said convex curved surface of said fourth lens member has a radius of curvature which is shorter than that of each of the air-glass surfaces of the first three lens members;
   g. the fifth lens member has a negative power, with the more strongly curved surface facing the image; and,
   h. the sixth lens member is bi-convex and has a positive power.

2. An objective according to claim 1, wherein at least one of said lens members is a cemented lens member.

3. An objective according to claim 2, wherein said fourth lens member is a cemented lens member.

4. An objective according to claim 3 wherein:
the focal length F of the entire systems ranges from 15.8 mm. when said second lens member is in its rearmost position to 28.4 mm. when said second lens member is in its forward position and is 21.15 mm. when said second lens member is in its middle position;
the focal length of the lens group consisting of said third, fourth, fifth and sixth lens members is 27.13 mm;
the focal length of said first lens member is −100.73 mm. and the free diameter thereof is about 23 mm.;
the focal length of said second lens member is −60.17 mm. and the free diameter thereof is about 24 mm.;
said fourth lens member consists of two lens elements cemented together;
said first through third lens members, said two lens elements and said fifth and sixth lens members, designated $L_1$—$L_7$, respectively, have radii of curvature $r_1$—$r_{13}$, thicknesses $d_1$—$d_7$ and separations $l_1$—$l_5$, respectively, said radii of curvature thickness and separations, as well as the refractive indices $n_d$ and Abbe numbers $\gamma_d$ are substantially as given in the following table:

| | | | $n_d$ | $\nu_d$ |
|---|---|---|---|---|
| $L_1$ | $r_1$=−34.37 | $d_1$=1.10 | 1.53172 | 59.6 |
| | $r_2$=−97.00 | $l_1$=18.20±17.9 | | |
| $L_2$ | $r_3$=+85.00 | $d_2$=2.80 | 1.64050 | 60.1 |
| | $r_4$=−69.61 | $l_2$=18.20±17.9 | | |
| $L_3$ | $r_5$=+29.50 | $d_3$=1.90 | 1.55232 | 63.5 |
| | $r_6$=+319.10 | $l_3$=0.15 | | |
| $L_4$ | $r_7$=+12.37 | $d_4$=4.00 | 1.64050 | 60.1 |
| $L_5$ | $r_8$=−80.00 | $d_5$=1.50 | 1.68893 | 31.2 |
| | $r_9$=+53.00 | $l_4$=0.72 | | |
| $L_6$ | $r_{10}$=+288.86 | $d_6$=5.40 | 1.72825 | 28.4 |
| | $r_{11}$=+7.55 | $l_5$=2.50 | | |
| $L_7$ | $r_{12}$=+21.00 | $d_7$=2.20 | 1.73520 | 35.8 |
| | $r_{13}$=−32.00 | | | |

NOTE: $s_o'$=7.0 mm.

5. An objective according to claim 2, wherein said second lens member is a cemented lens member.

6. An objective according to claim 5, wherein:
the focal length F of the entire system ranges from 15.5 mm. when said second lens member is in its rearmost position to 24.5 mm. when said second lens member is in its middle position;
the focal length of the lens group consisting of said third, fourth, fifth and sixth lens members is 23 mm.;

the free lens diameter is about 23 mm;
the focal length of said second lens member is +68.4 mm. and the free lens diameter is about 23 mm.;
said second lens member consists of two lens elements cemented together;
said first lens member, said two lens elements, and said third through sixth lens members, designated $L_1$—$L_7$, respectively, have radii of curvature $r_1$—$r_{13}$, thicknesses $d_1$—$d_7$ and separations $l_1$—$l_5$, respectively, said radii of curvature, thicknesses and separations, as well as the refractive indices $n_d$ and Abbe numbers $\gamma_d$ are substantially as given in the following table;

|  |  |  | $n_d$ | $\nu_d$ |
|---|---|---|---|---|
| $L_1$ | $r_1 = -40.71$ | $d_1 = 0.60$ | 1.53113 | 62.2 |
|  | $r_2 = -110.56$ |  |  |  |
|  |  | $l_1 = 15.90 \pm 15.7$ |  |  |
| $L_2$ | $r_3 = +84.23$ | $d_2 = 3.00$ | 1.62041 | 60.3 |
|  | $r_4 = -35.00$ |  |  |  |
| $L_3$ |  | $d_3 = 0.50$ | 1.62004 | 36.4 |
|  | $r_5 = -84.23$ |  |  |  |
|  |  | $l_2 = 15.90 \pm 15.7$ |  |  |
|  | $r_6 = +30.38$ |  |  |  |
| $L_4$ |  | $d_4 = 1.70$ | 1.54883 | 45.4 |
|  | $r_7 = \infty$ |  |  |  |
|  |  | $l_3 = 0.15$ |  |  |
|  | $r_8 = +9.62$ |  |  |  |
| $L_5$ |  | $d_5 = 3.30$ | 1.62041 | 60.3 |
|  | $r_9 = +49.27$ |  |  |  |
|  |  | $l_4 = 0.55$ |  |  |
|  | $r_{10} = +368.75$ |  |  |  |
| $L_6$ |  | $d_6 = 4.80$ | 1.72825 | 28.4 |
|  | $r_{11} = +6.59$ |  |  |  |
|  |  | $l_5 = 2.90$ |  |  |
|  | $r_{12} = +14.62$ |  |  |  |
| $L_7$ |  | $d_7 = 2.00$ | 1.66882 | 57.4 |
|  | $r_{13} = -35.85$ |  |  |  |

NOTE: $s_0' = 7.8$ mm.

7. An objective according to claim 2, wherein said third lens member is a cemented lens member.

8. An objective according to claim 7, wherein:
the focal length F of the entire system ranges from 15.5 mm. when said second lens member is in its rearmost position to 24.5 mm. when said second lens member is in its forward position and is 19.5 mm. when said second lens member is in its middle position;
the focal length of the lens group consisting of said third, fourth, fifth and sixth lens members is 22.8 mm.;
the focal length of said first lens member is −121.5 mm. and the free diameter thereof is about 23 mm.;
the focal length of said second lens member is +68.2 and the free diameter thereof is about 23 mm;
said third lens member consists of two lens elements cemented together;
said first and second lens members, said two lens elements, and said fourth through sixth lens members, designated $L_1$—$L_7$, respectively, have radii of curvature $r_1$—$r_{13}$, thicknesses $d_1$—$d_7$ and separations $l_1$—$l_5$, respectively, said radii of curvature, thicknesses and separations as well as the refractive indices $n_d$ and Abbe numbers $\gamma_d$ are substantially as given in the table:

9. An objective according to claim 2, wherein each of said fourth lens member and said fifth lens member is a cemented lens member.

10. An objective according to claim 9, wherein:
the focal length F, of the entire system ranges from 15.8 mm. when said second lens member is in its rearmost position to 28.4 mm. when said second lens member is in its forward position and is 21.1 mm. when said second lens member is in its middle position;
the focal length of the lens group consisting of said third, fourth, fifth and sixth lens members is +27.1 mm.;
the focal length of said second lens member is +100.7 mm. and the free lens diameter thereof is about 23 mm.;
the focal length of said second lens member is +60.2 mm. and the free lens diameter thereof is about 24 mm.;
said fourth and fifth lens members each consist of two lens elements cemented together;
said first through third lens members, and said lens elements and said sixth lens members, designated $L_1$—$L_8$, respectively, have radii of curvature $r_1$—$r_{14}$, thicknesses $d_1$—$d_8$ and separations $l_1$—$l_5$, respectively, said radii of curvature, thicknesses and separations, as well as the refractive indices $n_d$ and Abbe numbers $\gamma_d$ are substantially as given in the following table:

|  |  |  | $n_d$ | $\nu_d$ |
|---|---|---|---|---|
| $L_1$ | $r_1 = -40.71$ | $d_1 = 0.60$ | 1.53172 | 48.80 |
|  | $r_2 = -110.56$ |  |  |  |
|  |  | $l_1 = 15.90 \pm 15.7$ |  |  |
| $L_2$ | $r_3 = +84.00$ | $d_2 = 3.00$ | 1.62041 | 60.30 |
|  | $r_4 = -84.00$ |  |  |  |
|  |  | $l_2 = 15.90 \pm 15.7$ |  |  |
|  | $r_5 = +30.00$ |  |  |  |
| $L^3$ |  | $d_3 = 2.50$ | 1.52542 | 64.70 |
|  | $r_6 = -32.00$ |  |  |  |
| $L^4$ |  | $d_4 = 0.80$ | 1.62374 | 47.00 |
|  | $r_7 = -142.40$ |  |  |  |
|  |  | $l_3 = 0.15$ |  |  |
|  | $r_8 = +9.62$ |  |  |  |
| $L^5$ |  | $d_5 = 3.30$ | 1.62041 | 60.30 |
|  | $r_9 = +49.27$ |  |  |  |
|  |  | $l_4 = 0.55$ |  |  |
|  | $r_{10} = +330.00$ |  |  |  |
| $L^6$ |  | $d_6 = 4.80$ | 1.72825 | 28.40 |
|  | $r_{11} = +6.568$ |  |  |  |
|  |  | $l_5 = 2.90$ |  |  |
|  | $r_{12} = 14.62$ |  |  |  |
| $L^7$ |  | $d_7 = 2.00$ | 1.67003 | 47.10 |
|  | $r_{13} = -35.85$ |  |  |  |

NOTE: $s_0' = 7.25$ mm.

|  |  |  | $n_d$ | $\nu_d$ |
|---|---|---|---|---|
| $L_1$ | $r_1 = -34.37$ | $d_1 = 1.10$ | 1.54869 | 45.4 |
|  | $r_2 = -91.93$ |  |  |  |
|  |  | $l_1 = 18.20 \pm 17.9$ |  |  |
|  | $r_3 = +85.00$ |  |  |  |
| $L_2$ |  | $d_2 = 2.80$ | 1.60450 | 60.1 |
|  | $r_4 = -69.60$ |  |  |  |
|  |  | $l_2 = 18.20 \pm 17.9$ |  |  |
|  | $r_5 = +29.50$ |  |  |  |
| $L_3$ |  | $d_3 = 1.90$ | 1.55232 | 63.5 |
|  | $r_6 = +319.00$ |  |  |  |
|  |  | $l_3 = 0.15$ |  |  |
|  | $r_7 = +12.37$ |  |  |  |
| $L_4$ |  | $d_4 = 4.00$ | 1.64050 | 60.1 |
|  | $r_8 = -80.00$ |  |  |  |
| $L_5$ |  | $d_5 = 1.50$ | 1.68893 | 31.2 |
|  | $r_9 = +53.00$ |  |  |  |
|  |  | $l_4 = 0.72$ |  |  |
|  | $r_{10} = +288.86$ |  |  |  |
| $L_6$ |  | $d_6 = 4.00$ | 1.72000 | 50.4 |
|  | $r_{11} = -28.96$ |  |  |  |
| $L_7$ |  | $d_7 = 1.40$ | 1.72825 | 28.4 |
|  | $r_{12} = +7.57$ |  |  |  |
|  |  | $l_5 = 2.50$ |  |  |
|  | $r_{13} = +21.00$ |  |  |  |
| $L_8$ |  | $d_8 = 2.20$ | 1.73520 | 35.8 |
|  | $r_{14} = -32.00$ |  |  |  |

NOTE: $s_0' = 7.0$ mm.